Aug. 26, 1969

D. E. NICHOLS 3,463,558

PRESSURE REGULATING VALVE

Filed Nov. 28, 1967

INVENTOR.
DONALD E. NICHOLS
BY
Paul L. Gardner
ATTORNEYS

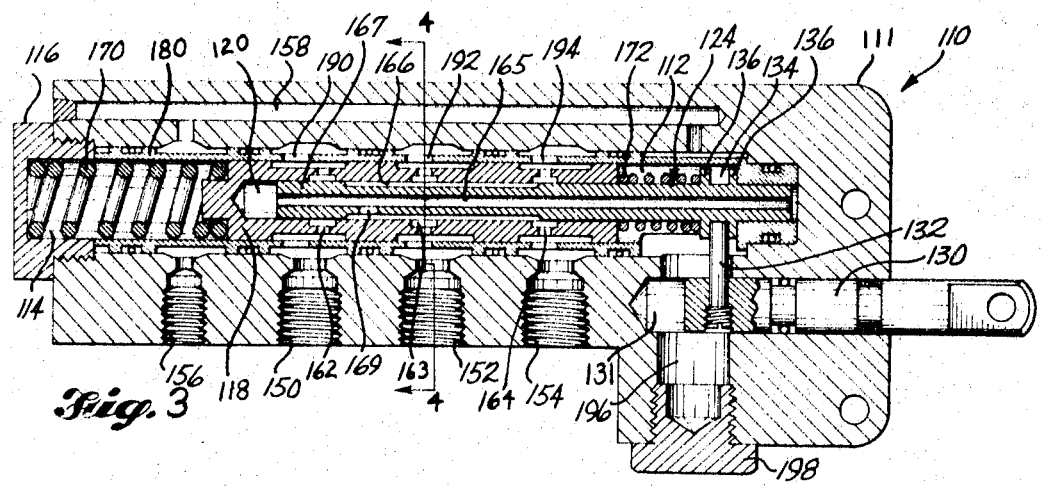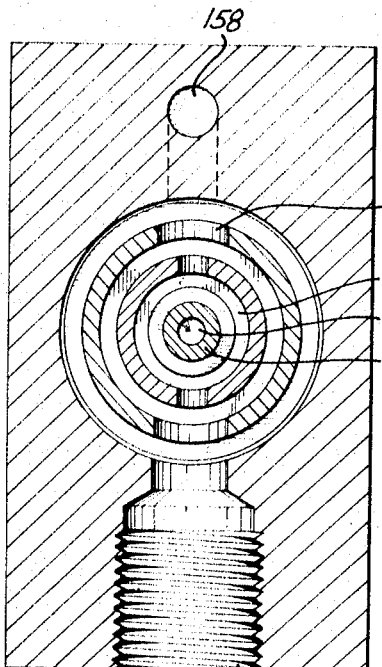

United States Patent Office 3,463,558
Patented Aug. 26, 1969

3,463,558
PRESSURE REGULATING VALVE
Donald E. Nichols, Seattle, Wash., assignor to The Boeing Company, Seattle, Wash., a corporation of Delaware
Filed Nov. 28, 1967, Ser. No. 686,028
Int. Cl. B60t 15/12, 15/06
U.S. Cl. 303—54                    9 Claims

ABSTRACT OF THE DISCLOSURE

A pressure regulating valve for controlling the flow of fluid from a source of fluid under pressure to a fluid pressure operable system, such as the wheel brakes of an airplane. The valve includes a manually operable input lever and is designed so that the displacement of the input lever from its "off" position is directly proportional to the fluid pressure in the system connected to the valve, and the lever is nonresponsive to fluid pressure variations in the system. In other words, no forces are fed back to the input lever from the system being operated.

The valve includes a housing having a generally cylindrical chamber therein, a generally cylindrical valve sleeve slidably disposed in the housing chamber, and a generally cylindrical slide valve slidably disposed in a cavity in the valve sleeve. Fluid inlet, outlet and return ports extend through the housing and communicate with the chamber, and the valve sleeve and slide valve are provided with ports, bores and grooves arranged to selectively block or permit fluid flow between the housing inlet and outlet ports or outlet and return ports. An auxiliary port also extends through the valve housing and communicates with the chamber for operating the valve hydraulically or pneumatically.

BACKGROUND OF THE INVENTION

Field of the invention

The present invention relates generally to valves, and more specifically to a manually operable pressure regulating valve which does not feed back a force to the operator.

Description of the prior art

In virtually all large airplanes manufactured today, braking of the landing gear wheels is accomplished by operating a fluid metering valve to supply fluid under pressure to friction brakes in the wheels. Typically, such a metering valve is operated from the pilot's pedals by cables which transmit a force back to the pedals as the fluid pressure built up in the brakes is "felt" in the valve.

One of the problems inherent in braking systems employing valves of the foregoing type is that the force felt by the pilot is not in phase with the brake pedal displacement because of the time lag required to transfer fluid into and out of the brakes. In other words, since an interval of time is required to fill the brake cylinders before any pressure builds up in the system and is "felt" in the valve, the pilot will not feel any resistance when he initially depresses the pedal. The natural reaction of the pilot upon depressing the pedal and feeling no resistance is to depress the pedal further, thereby opening the valve further than necessary to produce the desired braking force. In order to achieve smooth braking, the pilot must prejudge the braking effect he will get from a given amount of pedal displacement. This requires an unnatural braking technique to be applied by the pilot.

Low pressure modulation (i.e., applying relatively light braking force) is particularly difficult with the type of system discussed above since increased lag time is required to fill the brake cylinders when the brake pedal is only slightly depressed and the metering valve is only partially open. "Stiffer" brakes which require only a minimum of braking fluid to move the brake shoes from initial contact to full pressure further complicate low pressure modulation techniques because of the abrupt increase in braking pressure following initial filling of the cylinders.

The use of "artificial feel" devices (e.g., springs) to provide the pilot with an "artificial force feel" indicative of the actual braking effect he will obtain from a given amount of pedal depression is ineffective when used with valves of the foregoing type so long as the valves feed back the actual (i.e., delayed) braking forces to the pilot.

SUMMARY OF THE INVENTION

It is an object of the present invention to provide a manually operable fluid pressure regulating valve having and input lever which is nonresponsive to (i.e., does not "feel") pressure variations in the valve or the pressure operable system connected thereto.

Another object of the present invention is to provide a pressure regulating valve wherein the displacement of the input lever from its "off" position is directly proportional to the fluid pressure delivered to the fluid operable system connected to the valve.

A further object of this invention is the provision of a pressure regulating valve of the type described above which may be operated manually or automatically (e.g., hydraulically or pneumatically).

The foregoing objects have been realized by the pressure regulating valve of the present invention which includes a pair of valve members slidably disposed between fluid inlet, outlet and return ports in the valve housing. Displacement of one of the valve members from its "off" position establishes communication between the inlet and outlet ports whereupon fluid under pressure is delivered from the supply connected to the inlet port to the system connected to the outlet port. As pressure builds up in the system being operated, it is felt in the valve housing and displaces the second valve member against the bias of a control spring. When the pressure in the system reaches a level proportional to the displacement of the first valve member, the second valve member is displaced to a position wherein it cooperates with the first valve member to block communication between the housing inlet and outlet ports.

To decrease the fluid pressure in the system connected to the outlet port, the first valve member is simply moved toward its initial "off" position a distance proportional to the amount of pressure drop desired. In such position, the first valve member will cooperate with the second valve member to establish communication between the housing outlet and return ports and "dump" fluid into the reservoir connected to the return port. As the pressure in the system decreases, the pressure drop will be felt in the housing and will permit the loaded control spring to return the second valve member toward the first valve member until it reaches a position wherein it again cooperates with the first valve member to block communication between the outlet and return ports. At this point, the system pressure will have been decreased to the desired level.

Thus, the position of the first valve member and the input lever which operates it is directly proportional to the pressure at the outlet port and the system connected thereto. Moreover, the first valve member is designed so that all fluid forces acting on it balance one another; that is, the resultant fluid force on the first valve member is always zero, so it "feels" no feedback force.

If the valve is employed in an airplane wheel braking system or other pressure operable system where it is desirable to have the operator "feel" a force indicative of the pressure build-up in the system to which he is metering fluid, an artificial "feel" unit (e.g., a spring cartridge) may be employed to provide the operator with a more accurate indication of the fluid pressure which will be delivered to the system by his displacement of the input lever.

The foregoing and other objects, features and advantages of the invention will be apparent from the following detailed description of the preferred embodiments of the invention, as illustrated in the accompanying drawings.

BRIEF DESCRIPTION OF THE DRAWINGS

In the drawings:

FIGURE 3 is a sectional side elevation view of a modified form of a pressure regulating valve constructed in accordance with the teachings of the present invention; and FIGURE 4 is a sectional elevation view along the line 4—4 of FIGURE 3 and looking in the direction of the arrows.

DETAILED DESCRIPTION OF THE PREFERRED EMBODIMENTS

Figure 1:
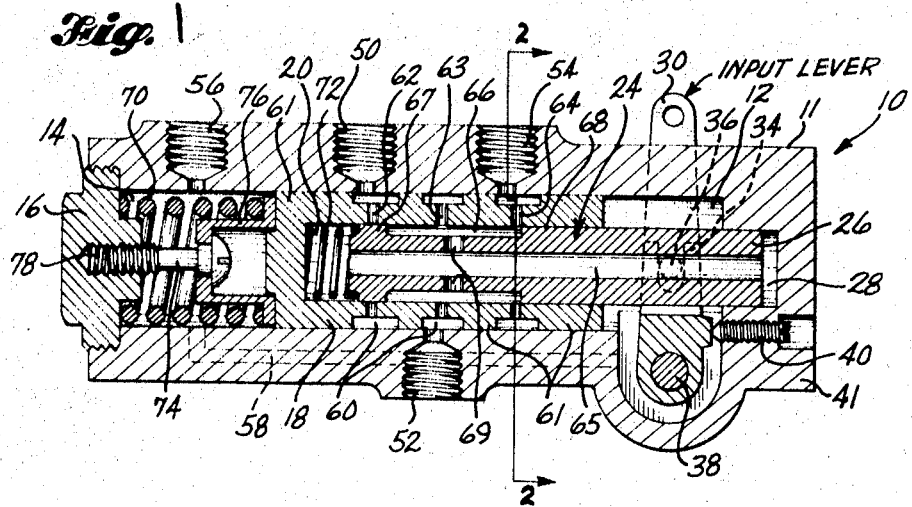
FIGURE 1 is a sectional side elevation view of a pressure regulating valve constructed in accordance with teachings of the present invention.

Referring now to the drawings, there is shown in FIGURE 1 a pressure regulating valve 10 comprising a housing 11 having a generally axially extending, cylindrical valve chamber 12 therein. The chamber 12 is closed at its forward end 14 by a threaded cap member 16 and contains a generally axially extending, pressure responsive valve sleeve 18 slidably disposed therein. The valve sleeve 18, in turn, includes a generally axially extending, rearwardly opening cavity 20 which slidably receives the forward end portion of a generally axially extending, manually operable slide valve 24. The rear end portion 26 of the slide valve 24 extends rearwardly out of the valve sleeve cavity 20 and into a reduced-diameter rear end portion 28 of the valve chamber 12.

Figure 2:
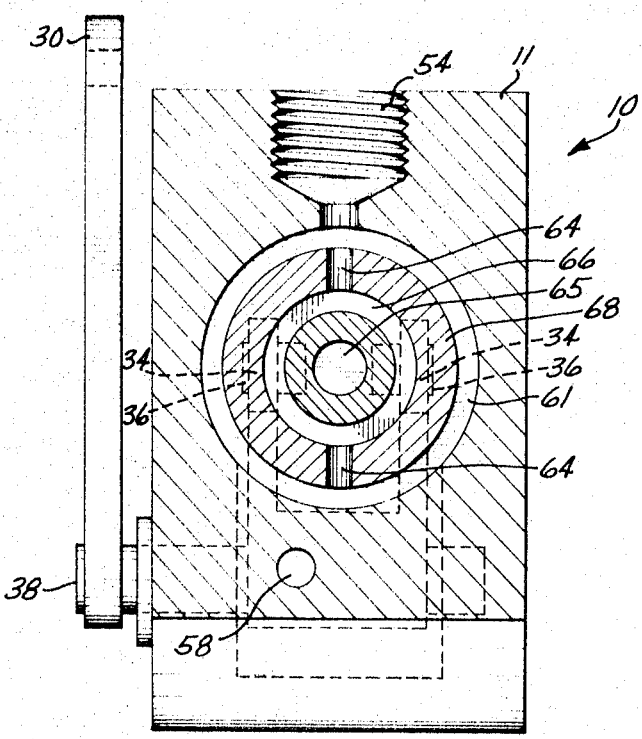
FIGURE 2 is a sectional elevation view taken along the line 2—2 of FIGURE 1 and looking in the direction of the arrows.

A manually operable input lever 30 is provided at the rear end of the valve 10 for selectively sliding the slide valve 24 axially relative to the valve sleeve 18 and the housing 11. The input lever 30 is mounted on a pivot shaft 38 which extends transversely through the housing and also mounts a pair of U-shaped sections 34, 34. As best shown in FIGURE 2, a pair of radially extending pins 36, 36 mounted on either side of the slide valve 24 are received by the U-shaped sections so that rotation of the lever 30 will produce axial movement of the slide valve. Clockwise rotation of the input lever 30 is limited by an adjustable abutment or stop member 40 which is threadably mounted in the rear portion 41 of the housing 11.

The housing 11 includes a fluid inlet port 50 adapted to be connected to a source of fluid under pressure (not shown), a fluid outlet port 52 adapted to be connected to a fluid operable system, such as a system of hydraulic wheel brakes (not shown), a return port 54 adapted to be connected to a fluid reservoir (not shown), and an auxiliary port 56. A fluid passage 58 connects the forward and rear portions of the valve chamber 12.

The valve sleeve 18 includes a series of axially-spaced grooves 60, 60, 60 between lands 61, 61, 61, 61 in its outer surface, and a series of axially-spaced sets of circumferentially-spaced, radially extending inlet, outlet and return openings 62, 63, 64, respectively. Each of the openings communicates with one of the grooves 60 and the interior of valve chamber 12.

A bore 65 extends axially through the manually operable slide valve 24 and communicates at its forward end 22 with the valve sleeve cavity 20 and at its rear end 26 with the reduced diameter portion 28 of the valve chamber 12. The slide valve 24 further includes a circumferentially and axially extending grooves 66 in its outer surface between a forward land 67 and a rear land 68 and a plurality of circumferentially-spaced, radially extending orifices 69 which communicate with the bore 65 and the groove 66.

A pressure control spring 70 disposed in the forward end 14 of the valve chamber 12 between the cap member 16 and the valve sleeve 18 biases the valve sleeve rearwardly (to the right in FIGURE 1) in the valve chamber 12. The force of spring 70 may be varied by means of an adjustable screw and bracket arrangement 74, 76. A centering spring 72, smaller and weaker than the control spring 70, is disposed between the forward end of the slide valve 24 and the forward end of valve sleeve 18 for urging the valve sleeve forwardly and the slide valve rearwardly in the valve chamber 12 with a relatively light force.

In operation, with the input lever 30 in the "off" position (the vertical position shown in FIGURE 1), the control spring 70 and the centering spring 72 maintain the valve sleeve 18 and the slide valve 24 in such positions relative to one another and to the housing 11 that the inlet openings 62 in the valve sleeve communicate with the housing inlet port 50, the outlet openings 63 communicate with the housing outlet port 52, the return openings 64 communicate with the housing return port 54, and the housing outlet port 52 communicates with the return port 54 via the valve sleeve outlet openings 63, the slide valve groove 66 and orifices 69, and the valve sleeve return openings 64. The forward land 67 on the slide valve blocks fluid flow from the housing inlet port 50. The centering spring 72 prevents the slide valve 24 from sliding in the cavity 20 due to vibratory forces or the like.

To regulate fluid pressure in a system (not shown) connected to the housing outlet port 52, the input lever 30 is rotated in counterclockwise direction to move the slide valve 24 forwardly (to the left in FIGURE 1) relative to the valve sleeve 18. As the slide valve moves forwardly, its forward land 67 uncovers the valve sleeve inlet openings 62 and communication is established between the housing inlet and outlet ports 50 and 52 via the valve slide groove 66 and orifices 69, while the rear land 68 covers the valve sleeve return openings 64 and blocks flow to the housing return port 54.

With fluid communication between the housing inlet and outlet ports 50 and 52 established, fluid under pressure will flow through the valve 10 and operate the system (not shown) connected to the outlet port. As the fluid pressure at the outlet port 52 increases, it will be felt in the forward end of the valve sleeve cavity 20 via the slide valve orifices 69 and bore 65. When the pressure at the outlet port and in the forward end of cavity 20 reaches a level sufficient to overcome the force of control spring 70, it will force the valve sleeve 18 forwardly against the bias of control spring 70 until the valve sleeve inlet openings 62 are covered by the forward land 67 on the slide valve 24, whereupon fluid from the inlet port 50 will again be blocked, thereby arresting further pressure rise. If further fluid pressure is desired in the system connected to the outlet port 52, the input lever 30 is rotated further in a counterclockwise direction to move the slide valve 24 further forwardly and again establish communication between the housing inlet and outlet ports 50 and 52. Since the force of the control spring 70 increases as it is depressed, the pressure required in the cavity 20 to move the valve sleeve 18 forwardly increases as the sleeve moves forwardly.

If it is desired to decrease the fluid pressure in the system connected to the outlet port 52, the input lever 30 is rotated in a clockwise direction to move the slide valve 24 rearwardly in the housing a distance proportional to the amount of pressure drop desired. In such position, the slide valve 24 will cooperate with the valve sleeve 18 to establish communication between the housing outlet and return ports, 52 and 54, and "dump" fluid into the reservoir (not shown) connected to the return port. As the pressure in the system decreases, the pressure drop will be felt in the housing and will permit the loaded control spring 70 to urge the valve sleeve 18 rearwardly toward the slide valve 24 until it reaches a position wherein it again cooperates with the slide valve to block communication between the outlet and return ports. At this point, the system pressure will have been decreased to the desired level. The displacement of the input lever from its "off" position is directly proportional to the pressure at the outlet port (i.e., the regulated pressure).

Since the areas of the opposite end faces of the slide valve 24 are equal and the fluid pressure acting against these faces is always equal (due to the presence of bore 65), the resultant hydraulic force on the slide valve is always zero. Thus, the slide valve is not responsive to increases or decreases of hydraulic pressure in the valve housing, and no force will be fed back to the input lever 30 when such changes in pressure occur.

The auxiliary port 56 provides an alternate means of operating the valve when the input lever 30 is in its "off" position. Fluid pressure introduced at the auxiliary port will cause a build-up of pressure in the forward end 14 of the valve chamber 12 and force the valve sleeve 18 rearwardly while the slide valve 24 remains stationary. As the valve sleeve moves rearwardly, communication between the inlet and outlet ports 50 and 52 will be established via the valve sleeve inlet openings 62, the slide valve groove 66 and orifices 69 and the valve sleeve outlet openings 63. When the pressure at the output port 52 builds up to the pressure at the auxiliary port 56, it will be felt in the valve chamber 20 and will force the valve sleeve 18 forwardly until the slide valve land 67 again blocks fluid flow from the inlet port 50.

The pressure regulating valve 110 shown in FIGURE 3 differs from the embodiment of FIGURES 1 and 2 in some structural details, but functions in substantially the same manner. The inlet port 150, outlet port 152, return port 154, and auxiliary port 156 are all axially aligned, thereby requiring that housing 111 be longer than the housing 11 in the FIGURE 1 embodiment where the outlet port 52 is circumferentially spaced from the other ports.

A barrel 180 lines the internal wall of the valve chamber 112 and functions as an anti-friction lining for the slidably disposed valve sleeve 118 and slide valve 124. The barrel liner includes forward, intermediate and rear sets of circumferentially-spaced ports 190, 192, 194 in fluid communication with the housing inlet, outlet and return ports 150, 152, and 154, respectively.

A single radially extending orifice 169 is provided in the slide valve 124 for selectively establishing communication between the interior of the chamber 112 and one of the housing ports 150, 152, 154 or 156.

The input lever 130 for moving the slide valve 124 is slidably disposed in an axially extending channel 131 in the rear portion of the housing 111. An actuating pin 132 mounted on the forward end of the lever extends radially into an annular channel 134 between flanges 136, 136 on the rear end of the slide valve 124. Linear movement of the input lever 130 will cause corresponding linear movement of the slide valve 124.

The forward end of the valve chamber 12 is closed by a threaded cap 116 and a control spring 170 disposed between the cap and the forward end of the valve sleeve 118 urges the valve sleeve rearwardly in the chamber. A centering spring 172, smaller and weaker than control spring 170, is disposed between the rear end of the valve sleeve 118 and the forward flange 136 on the slide valve 124 for preventing the slide valve from moving forwardly in valve sleeve cavity 120 due to vibrational forces or the like.

Access to the forward end of the lever 130 may be had through a threaded port 196 closed by a threaded cap 198 in the rear portion of the housing 111.

In operation, when the input lever 130 is actuated to move the slide valve 124 forwardly from its "off" (FIGURE 3) position, the forward land 167 on the slide valve 124 will uncover the valve sleeve inlet openings 162 and fluid will flow through the housing inlet port 150, the forward set of barrel ports 190, the valve sleeve inlet openings 162, the slide valve groove 166, the valve sleeve outlet openings 163, and the intermediate set of barrel ports 192 to the housing outlet port 152 and the system (not shown) connected thereto. As fluid pressure builds up at the outlet port 152, it will be felt in the forward end of the valve sleeve cavity 120 via the slide valve orifice 169 and bore 165. When the pressure in the valve sleeve cavity 120 reaches a level sufficient to overcome the force of control spring 170, it will force the valve sleeve 118 forwardly against the bias of the control spring until the valve sleeve inlet openings 162 are covered by the forward land 167 on the slide valve 124, whereupon fluid flow from the housing inlet port 150 will again be blocked, thereby arresting further pressure rise. If further pressure is desired in the system (not shown) connected to the outlet port 152, the input lever 130 must be moved further forwardly to again establish communication between the housing inlet and outlet ports 150 and 152.

If it is desired to decrease the fluid pressure in the system (not shown) connected to the outlet port 152, the input lever 130 is moved rearwardly to move the slide valve 124 rearwardly in the housing a distance proportional to the amount of pressure drop desired. In such position, the slide valve 124 will cooperate with the valve sleeve 118 to establish communication between the housing outlet and return ports, 152 and 154, and "dump" fluid into the reservoir (not shown) connected to the return port. As the pressure in the system decreases, the pressure drop will be felt in the housing and will permit the loaded control spring 170 to urge the valve sleeve 118 rearwardly toward the slide valve 124 until it reaches a position wherein it again cooperates with the slide valve to block communication between the outlet and return ports. At this point, the system pressure will have been decreased to the desired level.

Since the areas of the opposite end faces of the slide valve 124 are equal and the fluid pressure acting against them is always equal (due to the presence of bore 166), the slide valve will not be responsive to the fluid pressure in the housing. In other words, the slide valve will not move in response to fluid pressure changes at the outlet port 152, and the displacement of the slide valve and the input lever 130 from their "off" positions will be directly proportional to the fluid pressure at the outlet port.

The auxiliary port 156 provides an alternate means of operating the valve when the input lever 130 is in its "off" position. Fluid pressure introduced at the auxiliary port will cause a build-up of pressure in the forward end 114 of the valve chamber 112 which will force the valve sleeve 118 rearwardly while the slide valve 124 remains stationary. As the valve sleeve moves rearwardly, it will establish communication between the inlet and outlet ports 150 and 152 via the valve sleeve inlet openings 162, the slide valve groove 166 and the valve sleeve outlet openings 163. When the pressure at the outlet port 152 builds up to the pressure at the auxiliary port 156, that pressure will be felt in the valve chamber 120 and will force the valve sleeve 118 forwardly to again block fluid flow from the inlet port 150.

I claim:
1. A pressure regulating valve comprising:
    (a) a housing having an inlet port adapted to be connected to a source of fluid under pressure and an outlet port spaced from said inlet port and adapted to be connected to a fluid operable system;

(b) first and second valve members slidably disposed between said housing inlet and outlet ports;

(c) means normally maintaining said first and second valve members in a closed position wherein they cooperate to block communication between said housing inlet and outlet ports;

(d) means for displacing said second valve member relative to said first valve member to a position wherein it cooperates with said first valve member to establish communication between said housing inlet and outlet ports and increase the fluid pressure at said outlet port to a desired level; the level to which said outlet port pressure is increased being directly proportional to the distance said second valve member is displaced from its said closed position; and (e) means responsive to an increase in fluid pressure at said housing outlet port to about the said desired level to displace said first valve member to a position wherein it cooperates with said second valve member to block communication between said housing inlet and outlet ports.

2. A pressure regulating valve comprising:

(a) a housing having an inlet port adapted to be connected to a source of fluid under pressure and an outlet port spaced from said inlet port and adapted to be connected to a fluid operable system;

(b) first and second valve members slidably disposed between said housing inlet and outlet ports;

(c) means normally maintaining said first and second valve members in a closed position wherein they cooperate to block communication between said housing inlet and outlet ports;

(d) means for displacing said second valve member from its closed position to one of a plurality of open positions wherein it cooperates with said first valve member to establish communication between said housing inlet and outlet ports and increase the fluid pressure at said outlet port to a desired level; the level to which said outlet port pressure is increased being directly proportional to the distance said second valve member is displaced from its said closed position;

(e) means responsive to an increase in fluid pressure at said housing outlet port to about the said desired level to displace said first valve member to a position wherein it cooperates with said second valve member to block communication between said housing inlet and outlet ports; and (f) wherein said housing includes a generally axially extending valve chamber which communicates with said inlet and outlet ports; said first valve member comprises a valve sleeve slidably disposed in said housing chamber; said valve sleeve including: a generally axially extending cavity therein; a generally radially extending fluid inlet opening communicating with said valve sleeve cavity and adapted to communicate with said housing inlet port; a generally radially extending fluid outlet opening spaced from said fluid inlet opening and adapted to communicate with housing outlet port when said fluid inlet opening is in communication with said housing inlet port; and means closing one end of said valve sleeve cavity; and said second valve member comprises a slide valve slidably disposed in said valve sleeve cavity; said slide valve including: a bore extending therethrough, a circumferentially and axially extending groove in its outer surface, and a generally radially extending orifice communicating with said bore and said groove.

3. A pressure regulating valve according to claim 2 wherein said means normally maintaining said first and second valve members in a closed position comprises a spring member disposed in said housing chamber and biasing said valve sleeve to a position where its radially extending fluid inlet opening is covered by said slide valve.

4. A pressure regulating valve according to claim 1, wherein said housing further includes a generally radially extending return port communicating with said housing chamber and adapted to be connected to a fluid reservoir.

5. A pressure regulating valve according to claim 1, wherein said housing further includes a generally radially extending auxiliary port communicating with said housing chamber and adapted to be connected to a fluid operable system for automatically operating the valve.

6. A pressure regulating valve according to claim 1, wherein said means for displacing said second valve member comprises a manually operable input lever connected to said second valve member and extending out of said housing.

7. A pressure regulating valve comprising:

a housing member having a generally cylindrical axially extending chamber therein, a generally radially extending fluid inlet port communicating with said housing chamber and adapted to be connected to a source of fluid under pressure, and a generally radially extending fluid outlet port communicating with said housing chamber and adapted to be connected to a fluid operable system;

a generally cylindrical, axially extending valve sleeve slidably disposed in said housing chamber; said valve sleeve including: a generally cylindrical, axially extending cavity therein; a generally radially extending fluid inlet opening communicating with said valve sleeve cavity and adapted to communicate with said housing inlet port; a generally radially extending fluid outlet opening spaced from said fluid inlet opening and adapted to communicate with said housing outlet port when said fluid inlet opening is in communication with housing inlet port; and means closing one end of said valve sleeve cavity;

spring means normally biasing said valve sleeve to a position in which the fluid inlet and outlet openings thereof communicate with the housing inlet and outlet ports, respectively.

a generally cylindrical, axially extending slide valve slidably disposed in said valve sleeve cavity; said slide valve including: a bore extending axially therethrough, a circumferentially and axially extending groove in its outer surface, and a generally radially extending orifice communicating with said bore and said groove; and manually operable means connected to said slide valve for selectively sliding said slide valve in an axial direction to establish communication between said inlet and outlet ports of said valve sleeve and said housing, thereby permitting fluid under pressure to flow from said housing inlet port to said housing outlet port.

8. A pressure regulating valve according to claim 7, wherein said housing further includes a generally radially extending return port communicating with said housing chamber and adapted to be connected to a fluid reservoir.

9. A pressure regulating valve according to claim 7, wherein said housing further includes a generally radially extending auxiliary port communicating with said housing chamber and adapted to be connected to a fluid operable system for atomatically operating the valve.

References Cited

UNITED STATES PATENTS

| | | | |
|---|---|---|---|
| 2,484,888 | 10/1949 | Hollerith | 303—54 X |
| 3,042,061 | 7/1962 | Dobrikin | 303—500 X |
| 3,253,613 | 5/1966 | Richolt | 137—625.6 X |
| 3,366,424 | 1/1968 | Edwards | 303—52 |

MILTON BUCHLER, Primary Examiner

J. J. McLAUGHLIN, Jr., Assistant Examiner

U.S. Cl. X.R.

91—433; 137—625.6; 303—40, 52